United States Patent
Kawabe

[15] 3,693,146
[45] Sept. 19, 1972

[54] VEHICLE BRAKE FLUID PRESSURE MONITORING SYSTEM

[72] Inventor: Tsuneo Kawabe, Kariya, Japan

[73] Assignee: Aisin Seiki Kabushiki Kaisha, Aichi-ken, Japan

[22] Filed: Oct. 30, 1970

[21] Appl. No.: 85,406

[30] Foreign Application Priority Data

Nov. 1, 1969 Japan .....................44/87808

[52] U.S. Cl. ..............................340/52 C, 200/61.89
[51] Int. Cl. ..........................B60q 1/00, G08b 21/00
[58] Field of Search ...........340/52, 52 B, 52 C, 52 F; 200/61.89

[56] References Cited

UNITED STATES PATENTS 3,506,958  4/1970  Kawabe.......................340/52
3,394,345  7/1968  Thomas.......................340/52
3,573,725  4/1971  Shellhause...................340/60

*Primary Examiner*—Alvin H. Waring
*Attorney*—Berman, Davidson and Berman

[57] ABSTRACT

A braking fluid pressure sensing system capable of sensing and giving an alarm when damage or breakage occurs in the brake fluid pressure circuit during non-braking operation, comprising pressure means to operate the master cylinder regardless of operation of the brake pedal, and means for signaling an alarm when the value of the fluid pressure produced by the pressure means in the fluid pressure circuit falls below a predetermined value, thereby the driver of the vehicle may take precautions to prevent possible disastrous results due to the damage or breakage of the brake system.

9 Claims, 4 Drawing Figures

INVENTOR
TSUNEO KAWABE,

VEHICLE BRAKE FLUID PRESSURE MONITORING SYSTEM

The present invention relates to a system for sensing damage or breakage in a brake fluid pressure circuit for a vehicle, and more particularly to a novel system capable of sensing during non-braking operation the danger of loss of braking power caused by damage or breakage in the pressure of the master cylinder, the wheel cylinders and the pressure fluid circuit connecting the master cylinder to the wheel cylinders.

The braking system for the vehicle should have very safe and sure operation, and in this connection, any damage or breakage in the system should be found as early as possible for safe operation of the vehicle. In the ordinary type of braking system heretofore in use, however, the driver of the vehicle can recognize such damage or breakage only when applying actuating pressure to the brake pedal, which does not respond as it should. Then, an emergency brake provided for the vehicle is used for arresting the movement of the vehicle with poorer efficiency.

An improved brake system has been introduced which provides two brake fluid pressure circuits, wherein either one of the circuits is operative when the other is out of order. Even in this case, damage or breakage can only be recognized after it happens, and especially damage or breakage within the master cylinder would be apt to lead to disastrous results on high speed operation of the vehicle.

Thus, with ordinary brake systems, the vehicle driver is constantly fearful that he will sense damage or breakage in the system suddenly when the vehicle is moving rapidly. Furthermore, efficient braking is not obtainable under damage condition, and the movement of the vehicle can be arrested only with great difficulty when the damage or breakage occurs in the brake system.

A first important object of the present invention is, therefore, to provide a safe braking system including a braking fluid pressure sensing system which comprises pressure means to operate the master cylinder within a limit of the idle stroke range of the brake pedal to normally yield a low value of fluid pressure insufficient to effect braking operation in the master cylinder, the brake fluid pressure circuit and wheel brake cylinders during non-braking operation, when the brake pedal is not actuated, while the vehicle stops or runs, and means for signaling an alarm operable only when the fluid pressure value in the brake fluid pressure circuit falls below a predetermined value, normally one kilogram per square centimeter.

A second important object of the present invention is to provide a braking fluid pressure sensing system having the above-described features, wherein said pressure means comprises a vacuum actuator operated by negative pressure to be produced in the manifold of the prime engine of the vehicle, and connecting means to connect the vacuum actuator to an operation lever secured on the master cylinder, whereby the master cylinder is operated even during non-braking by the negative pressure in the engine manifold through the vacuum actuator so as to produce and maintain a low value of brake fluid pressure insufficient to effect braking.

A third important object of the present invention is to provide a braking fluid pressure sensing system having the above-described features, wherein said operation lever secured on the master cylinder is constructed to be operable within a limit of the idle stroke range of the brake pedal, thereby smooth and pleasant running of the vehicle is realizable without brake pedal movements during non-braking even with said pressure means.

A further important object of the present invention is to provide a brake fluid pressure sensing system having the above-described features, wherein said alarm means is provided with a brake lamp to be lighted only when fluid pressure over the predetermined value is produced within the brake pressure fluid circuit by actuation of the brake pedal, and with an alarm lamp to be lighted only when the fluid pressure to be produced within the brake pressure fluid circuit by the pressure means falls below a predetermined value during non-braking.

The above-described and still further objects, features and advantages of the present invention will become more apparent upon consideration of the following detailed description of one specific embodiment thereof, especially when taken in conjunction with the accompanying drawings.

Figure 1:
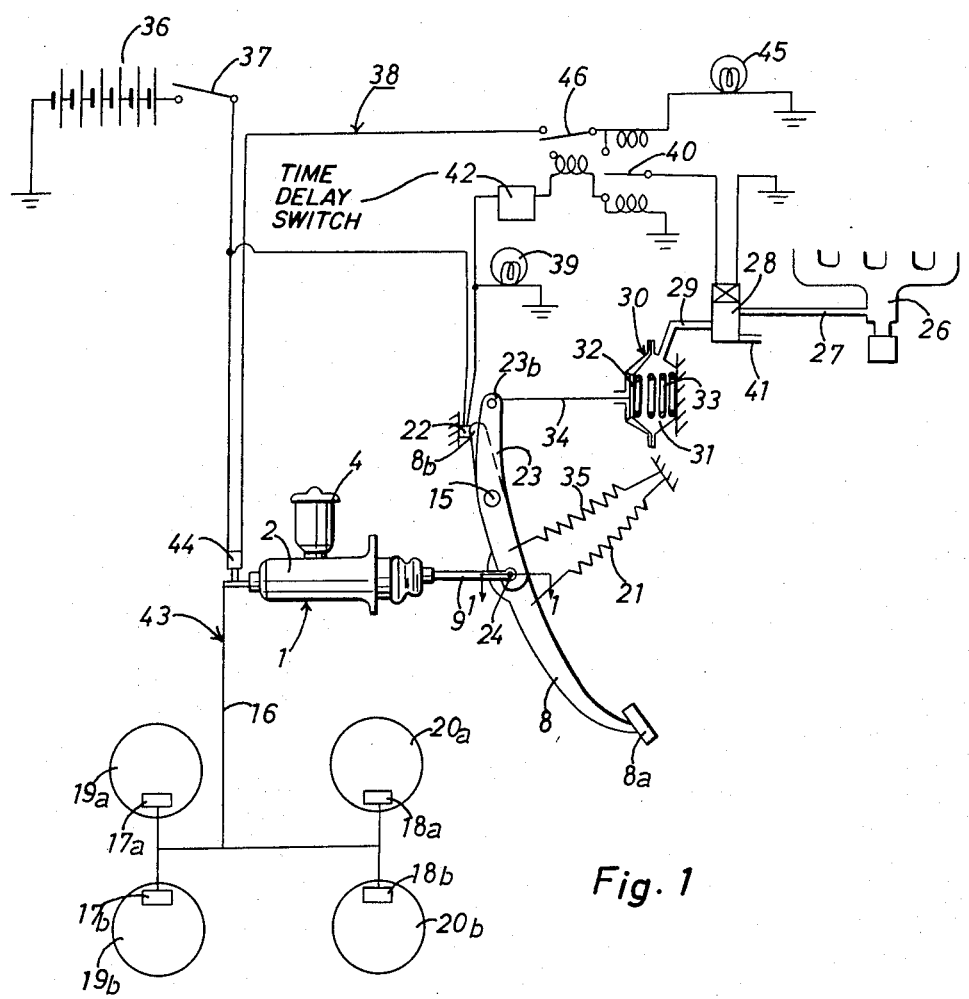
FIG. 1 is schematic diagram showing the circuit of one embodiment in accordance with the present invention.
Figure 4:
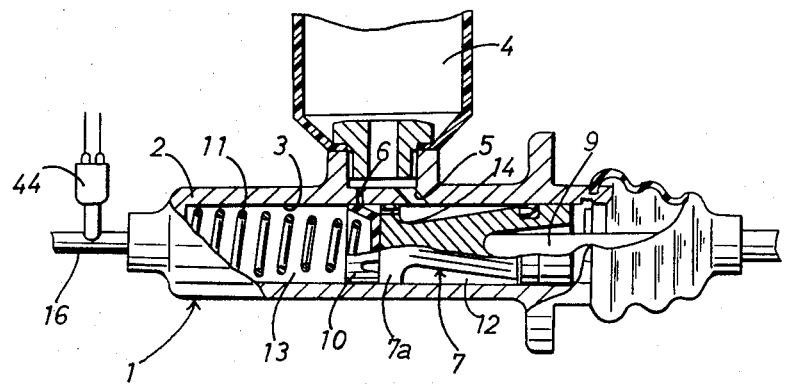
FIG. 4 is an elevational view of the master cylinder in FIG. 1 shown broken away and partly in section, wherein the piston cap closes the compensation hole.

Referring now to FIGS. 1 and 4, a well-known master cylinder 1 comprises a cylindrical bore 3 within the main body 2 thereof, an operation fluid reservoir 4 disposed on the upper portion of the main body 2 and connected to the cylindrical bore 3 through an inlet port 5 and a compensation hole 6 both of which are drilled in the main body 2, and a piston 7 reciprocable within the cylindrical bore 3. A push-rod 9 operates in response to actuation of a brake pedal 8 and butts against one end of the piston 7. A resilient cup-like cap 10 is urged against the other end of the piston 7 by a return spring 11. The piston 7 divides the cylindrical bore 3 into two chambers, a fluid supply chamber 12 and a pressure chamber 13. A through hole 14 is provided on a land portion 7a of the piston 7 so as to supply fluid to the pressure chamber 13 from the fluid supply chamber 12 past the outer circumference of the cap 10 when the piston 7 is retracted.

The brake pedal 8 is swingably pivoted about pin 15 as a fulcrum secured on the body of the vehicle. Actuation by downward pressure on the brake pedal 8 beyond the preset idle stroke thereof causes the cap 10 to close the compensation hole 6 connecting the operation fluid reservoir 4 with the pressure chamber 13 of the master cylinder 1. This produces braking fluid pressure in the pressure chamber 13. The braking fluid pressure is then transmitted to front wheel brake cylinders 17a and 17b and rear wheel brake cylinders 18a and 18b through a conduit 16 to operate the front wheel brakes 19a and 19b and the rear wheel brakes 20a and 20b. The brake pedal 8 is so designed as to return to the non-working position by a return spring 21 when the stepping force on the stepping piece or pedal 8a thereof is released. The upper tip 8b of the brake pedal 8 faces a selector switch 22 secured on the body of this vehicle. This selector switch 22 remains off while the tip 8b of the brake pedal keeps pressing during non-braking operation and closes when the tip 8b disengages the switch during braking operation.

Figure 3:
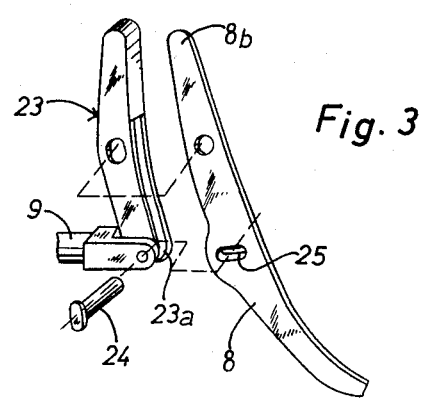
FIG. 3 is an exploded perspective view of the apparatus portion shown in FIG. 2.

A brake pedal lever 23 is supported by the pin 15 as a pivot, so as to have the same axis of revolution as the brake pedal 8, but is swingable regardless of the swing of the brake pedal. As shown more in detail in FIG. 3, the lower end 23a of the brake pedal lever 23 is connected to the push-rod 9 of the master cylinder 1 by a pin 24 which, inserted into a transverse elongated hole 25 drilled through the brake pedal 8 within the idle stroke length of the brake pedal 8, enables movements of the push-rod 9 and the brake pedal lever 23 against the brake pedal 8 along the transverse long hole 25.

Figure 2:
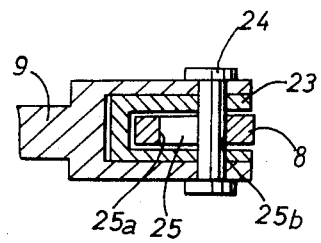
FIG. 2 is a fragmentary cross-sectional view taken along line 1—1 of FIG. 1.

Referring again to FIG. 1; while the brake pedal 8 is not actuated, vacuum produced within an intake manifold 26 of the prime engine (not shown) leads to an electro-selector valve 28 through a conduit 27. The vacuum further proceeds into an operation chamber 31 within a vacuum actuator 30 through a conduit 29 due to the construction of the electro-selector valve 28 to connect the conduit 27 to the conduit 29 while the electro-selector valve 28 is not energized. Occurrence of vacuum in chamber 31 moves a diaphragm piston 32 to the right, against biasing force of a return spring 33, to swing the brake pedal lever 23 about the fulcrum of pin 15, regardless of the swing of the brake pedal 8, by way of a piece of flexible wire or cable 34 stretched between the diaphragm piston 32 and the upper end 23b of the brake pedal lever 23. The flexible wire 34 becomes loose during braking operation and stays stretched during non-braking operation. Consequently, the push-rod 9 of the master cylinder 1, being secured to the brake pedal lever 23 by the pin 24, is pushed along the transverse hole 25. This movement produces a low value of fluid pressure within the master cylinder 1, the pressure value being so small as not to effect braking operation. At this moment, the pin 24 has moved leftward till it butts against the left end 25a of the transverse hole 25 from the position thereof as shown in FIG. 2. Actuation of the brake pedal 8 pushes the push-rod 9, by engagement with the pin 24, to create braking fluid pressure within the master cylinder 1, the pin 24 first butting and being urged against the right end 25b of the transverse long hole 25. The biasing force of a return spring 35 connected to the lever 23 is less than that of the return spring 21 connected to the brake pedal 8. Accordingly, the return spring 35 regulates the stroke distance of the brake pedal lever 23 during non-braking operation in the above described device.

Described below is the electrical circuit of the preferred embodiment with reference to FIG. 1. Battery 36 supplies electric current to the electrical circuit 38 when a main switch 37 is closed. Selector switch 22 in series with brake lamp 39 are connected between switch 37 and ground. Disengagement of the selector switch 22 with the tip 8b of the brake pedal 8 closes the switch 22 and energizes the brake lamp 39. Engagement of switch 22 with tip 8b opens switch 22 and deenergizes the brake lamp 39. When the selector switch 22 is conductive (closed) a relay switch 40 closes to energize the electro-selector valve 28 to connect the conduit 29 to an atmospheric conduit 41 and a relay switch 46 in line 38 opens. A time delay switch means 42 is interposed between the brake lamp 39 and the relay switch 40 and functions to open after a certain period of time during non-braking which then opens relay switch 40 and closes the switch 46. The certain period of time measures the time necessary for a braking pressure fluid circuit 43 to return to normal pressure with no extraordinary fluid pressure remaining therein. The braking pressure fluid circuit 43 comprises the pressure chamber 13 of the master cylinder 1, the conduit 16, and the wheel brake cylinders 17a, 17b, 18a and 18b. Consequently, the electro-selector valve 28 is deenergized after the certain period of time from the release of the brake pedal 8 and, then, the conduit 29 is connected to the conduit 27 extending from the intake manifold 26. Disposed within the electrical circuit 38 is a relay switch 46 which opens when electric current within the delay switch means 42 is over a predetermined amount and which closes when the electric current is less than the predetermined amount. The pressure switch 44 is disposed within the braking pressure fluid circuit 43, staying open while the braking pressure fluid circuit 43 maintains a predetermined or higher value of fluid pressure therein during non-braking operation. The pressure switch 44 closes and lights an alarm lamp 45 when the fluid pressure within the braking pressure fluid circuit 43 drops to or below the predetermined value of braking fluid pressure during non-braking operation. Accordingly, when the brake pedal 8 is released, the selector switch 22 is engaged by tip 8b and opens and the fluid pressure drops in the pressure chamber 13 of the master cylinder 1, but the delay switch means 42 for its set delay time period keeps the relay switch 46 open so as not to light the alarm lamp 45. And, when the electric current charged within the delay switch means 42 is less than the predetermined amount, relay switch 40 opens to deenergize valve 28 and operate the vacuum actuator 30. This swings the brake pedal lever 23 to produce fluid pressure in the pressure chamber 13 of the master cylinder 1, which keeps the alarm lamp 45 off through the relay switch 46 is closed.

In the system, as detailed above, application of pressure to the stepping piece 8a of the brake pedal 8 causes the pedal 8 to start to swing clockwise around the pin 15, and consequently, at the end of the idle stroke, the right end 25b of the transverse hole 25 in the brake pedal 8 butts against the pin 24 holding the brake pedal lever 23 and the push-rod 9 of the master cylinder 1 together. Through the pin 24, the operating movement of pedal 8 is transferred to the push-rod 9 to produce fluid pressure within the pressure chamber 13 of the master cylinder 1. At the same time, the brake pedal lever 23 swings clockwise around the pin 15 together with the brake pedal 8, which, in turn, moves the tip 23b of the brake pedal lever 23 rightward to loosen the wire 34 connecting the diaphragm piston 32 of the vacuum actuator 30 to the tip 23b. The fluid pressure produced within the pressure chamber 13 of the master cylinder 1 proceeds through the conduit 16 to the front wheel brake cylinders 17a and 17b and the rear wheel brake cylinders 18a and 18b to effect operation of the front and rear wheel brakes 19a, 19b, 20a and 20b. The pressure switch 44 within the braking pressure fluid circuit 43 is kept open by the fluid pressure within the pressure chamber 13 of the master cylinder 1. The swing of the brake pedal 8 disengages the tip 8b from the selector switch 22 which thus closes to light the brake lamp 39 and to operate the relay switch 40 through the delay means 42. This supplies electrical current into the electro-selector valve 28 to energize the latter and connect the conduit 29 to the atmospheric conduit 41. The atmosphere now enters the operation chamber 31 of the vacuum actuator 30 causing the diaphragm piston 32 return to its original situation aided by force of the return spring 33.

Now, when the brake pedal 8 is released by removal of foot pressure, the master cylinder 1 returns to its original condition because of the fluid pressure in the conduit 16, and the push-rod 9 and the pin 24 move rightward. The brake pedal 8 and the brake pedal lever 23 return to their original positions respectively by force of the return spring 21 and the return spring 35 (the latter having the lesser biasing force. The pin 24 butts against the right end 25b of the transverse hole 25 in the brake lever and both return to their original positions together with the push-rod 9 of the master cylinder 1. This causes the tip 8b of the brake pedal 8 to butt and press against the selector switch 22 which opens to shut off the brake lamp 39. Thus, the flow of electric current into the delay means 42 is blocked at switch 22, but by operation of the delay means 42, the electro-selector valve 28 stays on for the length of the delay period, which is the time necessary for the braking pressure fluid circuit 43 to return to its normal pressure with no extraordinary fluid pressure remaining therein. Then, when the electro-selector valve 28 is deenergized through opening of switch 40, the conduit 29 is connected to the conduit 27 extending from the intake manifold 26. Accordingly, vacuum within the intake manifold 26 expands into the operation chamber 31 of the vacuum actuator 30 to operate the diaphragm piston 32. The diaphragm piston 32 in turn moves against the biasing force of the return spring 33 and through the wire 34 causes the brake pedal lever 23 to swing clockwise around the pin 15. At this time, the pressure switch 44 closes if the fluid pressure within the pressure chamber 13 of the master cylinder 1 drops below the predetermined value. The alarm lamp 45 is, however, not lighted since the relay switch 46 remains open by the closed condition of delay means 42.

When electric current charged within the delay switch means 42 drops below the predetermined amount, the relay switch 40 opens, de-energizes valve 28 and the vacuum actuator 30 swings the brake pedal lever 23. This moves the pin 24 holding the push-rod 9 and the brake pedal lever 23 together toward the left end 25a of the transverse long hole 25 within the limit of the idle stroke of the brake pedal 8, the idle stroke being measured by the length between the right end 25b and the left end 25a of the transverse hole 25 in the brake pedal 8. Consequently, low fluid pressure insufficient to effect braking operation is produced within the pressure chamber 13 of the master cylinder 1, which keeps the alarm lamp 45 off though the relay switch 46 closes.

When an accident or breakage occurs within the braking pressure fluid circuit 43, while the brake pedal 8 is released, the master cylinder 1 is, or is put, in the condition just described by operation of the vacuum actuator 30 to move the pin 24 to butt against the left end 25a of the transverse hole 25 in the brake pedal 8. When and after the pin 24 reaches the left end 25a of the transverse hole 25, no further supplement of fluid pressure is made to the master cylinder 1 and the fluid pressure within the braking pressure circuit 43 drops lower and lower as the fluid pressure leaks out due to the aforesaid breakage. At the moment the fluid pressure drops below a predetermined value, the pressure switch 44 is closed and the alarm lamp 45 is lighted. Furthermore, the relay switch 40 closes to energize the electro-selector valve 28, which, in turn, connects the conduit 29 to the conduit 41. Consequently, the vacuum actuator becomes inoperable to move the piston 32 to the right and the brake pedal lever 23 returns to its original or normal position. This returns the master cylinder to its original state as with release of foot pressure on the brake pedal. The alarm signal, of course, warns the vehicle operator and gives him time to bring the vehicle to a halt without danger and to then repair the breakage.

Although a certain specific embodiment of the invention has been shown and described, it is obvious that many modifications thereof are possible. The invention, therefore, is not intended to be restricted to the exact showing of the drawings and description thereof, but is considered to include reasonable and obvious equivalents.

What is claimed is:

1. A braking fluid pressure sensing system for a vehicle comprising, a master cylinder to produce braking fluid pressure and operatively connected to a brake pedal through a push-rod, braking pressure fluid circuits including the pressure chamber of the master cylinder, wheel brake cylinders and pressure fluid circuits connecting the wheel cylinders to said pressure chamber, a pressure generating actuator to operate said master cylinder to produce and maintain a low value of fluid pressure insufficient to effect braking operation within said braking pressure fluid circuits during non-braking operation when said brake pedal is not actuated, an operation lever secured on said push-rod for connecting said actuator to said push-rod to operate the master cylinder and pivoted on a fixed member of the vehicle, and means to signal an alarm only when the value of the fluid pressure within said braking pressure fluid circuits drops to or below a predetermined value during non-braking operation.

2. A braking fluid pressure sensing system as set forth in claim 1, wherein said pressure generating actuator is a vacuum actuator connected to the manifold of the prime engine of the vehicle.

3. A braking fluid pressure sensing system as set forth in claim 2, wherein said operation lever is secured to said push-rod by a pin which rides in an elongated transverse slot in said brake pedal, whereby said vacuum actuator is effective to operate said master cylinder despite actuation of said brake pedal an amount denoted by said elongated slot.

4. A braking fluid pressure sensing system as set forth in claim 2, wherein said vacuum actuator is connected to said operation lever by a flexible wire attached thereto at one side of the lever fulcrum.

5. A braking fluid pressure sensing system as set forth in claim 2, wherein said means to signal an alarm comprises a source of electric current, an alarm lamp, and a pressure switch disposed within said braking pressure fluid circuits, said pressure switch being operative to connect said electric current source to said alarm lamp only when the value of the braking fluid pressure within said braking pressure fluid circuits drops to or below a predetermined value during nonbraking operation.

6. A braking fluid pressure sensing system as set forth in claim 5, wherein said means to signal an alarm further comprises a brake lamp and means for lighting said brake lamp only when said brake pedal is actuated.

7. A braking fluid pressure sensing system as set forth in claim 6, wherein said means to signal an alarm further comprises an electro-selector valve interposed between said vacuum actuator and said engine manifold, and selector switch means operative to connect said vacuum actuator to said engine manifold through said electro-selector valve only when said brake pedal is not actuated.

8. A braking fluid pressure sensing system as set forth in claim 7, wherein said brake lamp is lighted by operation of said selector switch means.

9. A braking fluid pressure sensing system as set forth in claim 7, wherein delaying means is interposed between said selector switch means and said electro-selector valve, and a relay switch is disposed between said pressure switch and said alarm lamp and is operated in response to electric current in said delaying means.

* * * * *